United States Patent
Milostan

(10) Patent No.: US 10,527,102 B2
(45) Date of Patent: Jan. 7, 2020

(54) PINION NEEDLE ROLLER BEARING POST FOR USE DURING PINION GEAR CARRIER ASSEMBLY

(71) Applicant: GM GLOBAL TECHNOLOGY OPERATIONS LLC, Detroit, MI (US)

(72) Inventor: Richard P Milostan, Vassar, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 125 days.

(21) Appl. No.: 15/726,880

(22) Filed: Oct. 6, 2017

(65) Prior Publication Data
US 2019/0107156 A1   Apr. 11, 2019

(51) Int. Cl.
*F16C 43/06* (2006.01)
*F16C 19/46* (2006.01)
*F16H 57/08* (2006.01)
*F16C 29/00* (2006.01)

(52) U.S. Cl.
CPC .............. *F16C 43/06* (2013.01); *F16C 19/46* (2013.01); *F16H 57/08* (2013.01); *F16C 29/002* (2013.01); *F16C 2361/61* (2013.01); *F16H 2057/085* (2013.01); *Y10T 29/497* (2015.01); *Y10T 29/49682* (2015.01); *Y10T 29/49686* (2015.01); *Y10T 29/53104* (2015.01)

(58) Field of Classification Search
CPC ........ F16C 19/46; F16C 43/06; F16C 29/002; Y10T 29/53104; Y10T 29/497; Y10T 29/49682; Y10T 29/49686; F16H 2057/087; F16H 57/082; G01P 3/446
USPC ..................................... 384/37, 448
See application file for complete search history.

(56) References Cited

U.S. PATENT DOCUMENTS

| | | | |
|---|---|---|---|
| 2,860,406 A | 11/1958 | Reichardt | |
| 3,345,723 A * | 10/1967 | Stilla ....................... | F16C 19/46 29/724 |
| 4,398,777 A | 8/1983 | Murphy | |
| 5,255,993 A | 10/1993 | Kovacs | |
| 7,753,594 B2 * | 7/2010 | Muterspaw ............. | F16C 19/46 384/448 |
| 2008/0022528 A1 | 1/2008 | Hasiak et al. | |
| 2009/0067762 A1 | 3/2009 | Muterspaw | |

FOREIGN PATENT DOCUMENTS

| | | |
|---|---|---|
| DE | 3913343 A1 | 10/1990 |
| EP | 0009994 A1 | 4/1980 |
| GB | 362166 A | 12/1931 |

* cited by examiner

*Primary Examiner* — Jermie E Cozart

(57) ABSTRACT

A pinion needle roller bearing post for use during pinion gear carrier assembly includes a solid cylindrical post having a longitudinal surface wall extending between a first end and a second end. At least one radially recessed channel is disposed in the longitudinal surface and extends substantially between the first end and the second end and a spring biased needle roller is disposed within the at least one radially recessed channel that operates to prevent needle roller bearing skew during pinion gear carrier assembly.

8 Claims, 4 Drawing Sheets

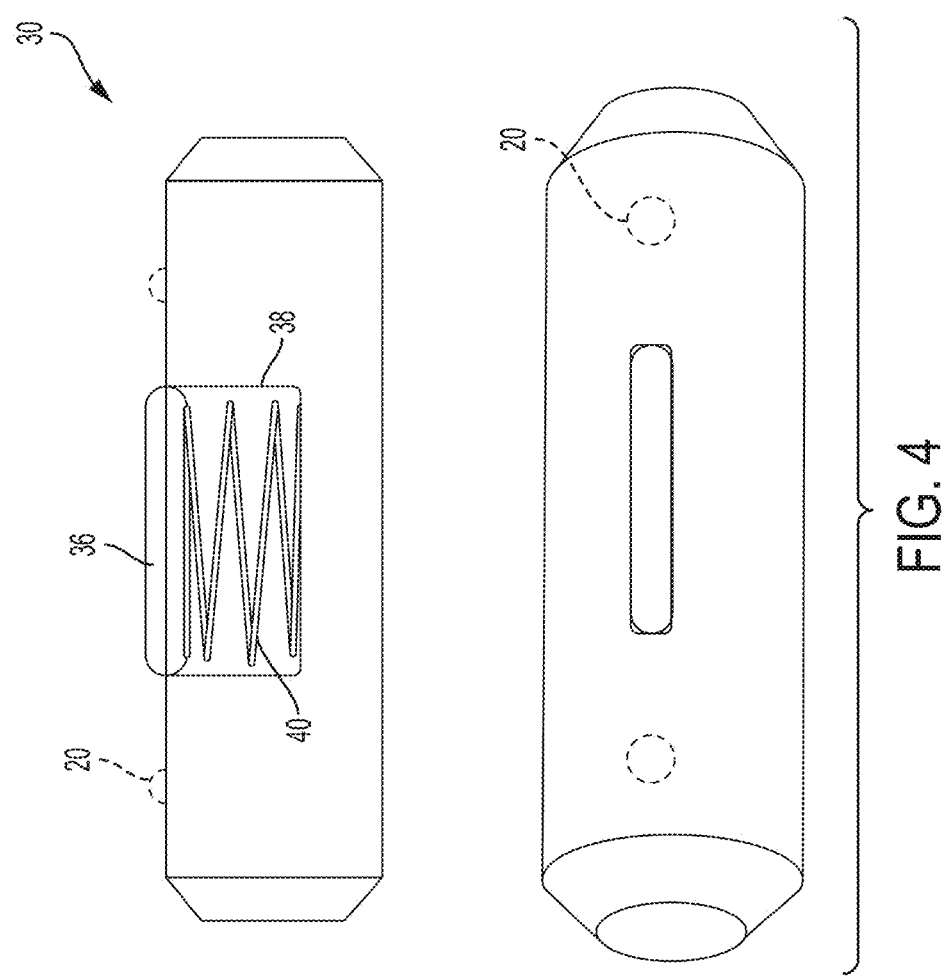

PINION NEEDLE ROLLER BEARING POST FOR USE DURING PINION GEAR CARRIER ASSEMBLY

FIELD

The invention relates generally to assembling a pinion gear carrier, and more particularly to a pinion needle roller bearing post for use during pinion gear carrier assembly.

BACKGROUND

The statements in this section merely provide background information related to the present disclosure and may or may not constitute prior art.

A typical planet carrier assembly used in planetary gear sets includes a spider carrier welded to a carrier flange or shell. A plurality of pinion pins and pinion washers are supported for rotation within the spider carrier. The pinion pins in turn support for rotation a plurality of planet gears.

While previous methods for assembling a planet carrier are useful for their intended purpose, there is room in the art for improved methods of assembling planet carriers for gear sets that reduce construction and machining costs, decrease package size, and reduce the weight of a transmission.

SUMMARY

One or more exemplary embodiments address the above issue by providing a pinion needle roller bearing post for use during pinion gear carrier assembly.

According to an aspect of an exemplary embodiment, a pinion needle roller bearing post for use during pinion gear carrier assembly includes a solid cylindrical post having a longitudinal surface wall extending between a first end and a second end. And another aspect includes at least one radially recessed channel disposed in the longitudinal surface and extends substantially between the first end and the second end. And yet another aspect includes a spring biased needle roller disposed within the at least one radially recessed channel operative to prevent needle roller bearing skew during pinion gear carrier assembly.

A further aspect in accordance with the exemplary embodiment wherein the spring biased needle roller provides longitudinal positive contact with adjacent needle roller bearings on the longitudinal surface area. And another aspect includes at least one retention ball plunger disposed adjacent either the first or the second end. Still another aspect includes at least one retention ball plunger disposed adjacent the first and the second end. And yet another aspect includes a spring disposed in the at least one radially recessed channel for maintaining a positive biasing force with the spring biased needle roller at the longitudinal surface wall. And still another aspect wherein the spring substantially extends the length of the at least one radially recessed channel.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the disclosed exemplary embodiments in any way.

FIG. 4 is an enlarged illustration of the needle roller bearing post in accordance with aspects of the exemplary embodiment.

DETAILED DESCRIPTION

The following description is merely exemplary in nature and is not intended to limit the present disclosure, application, or uses.

Figure 1:
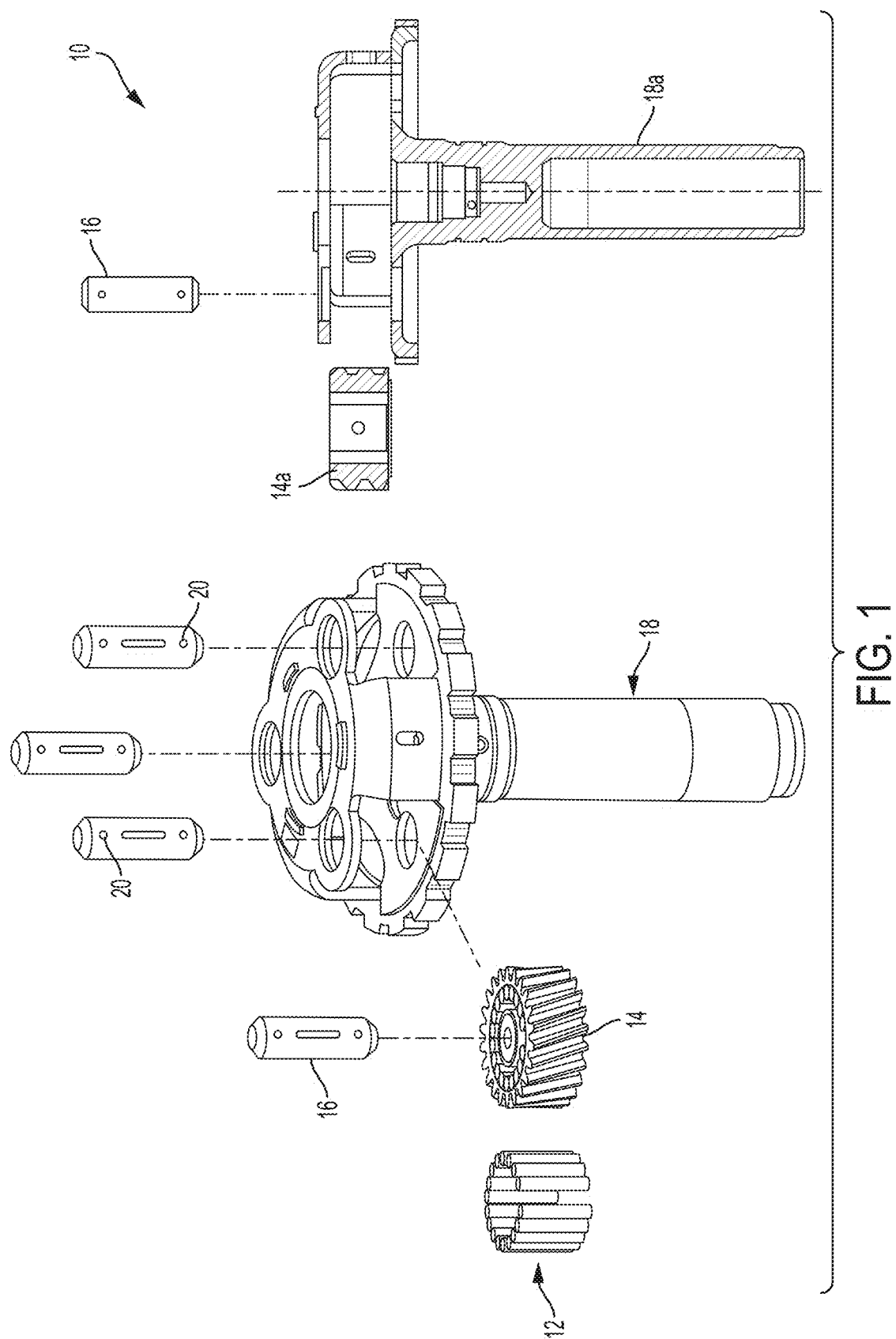
FIG. 1 is an illustration of pre-assembled components included in a pinion gear carrier assembly process.
Figure 2:
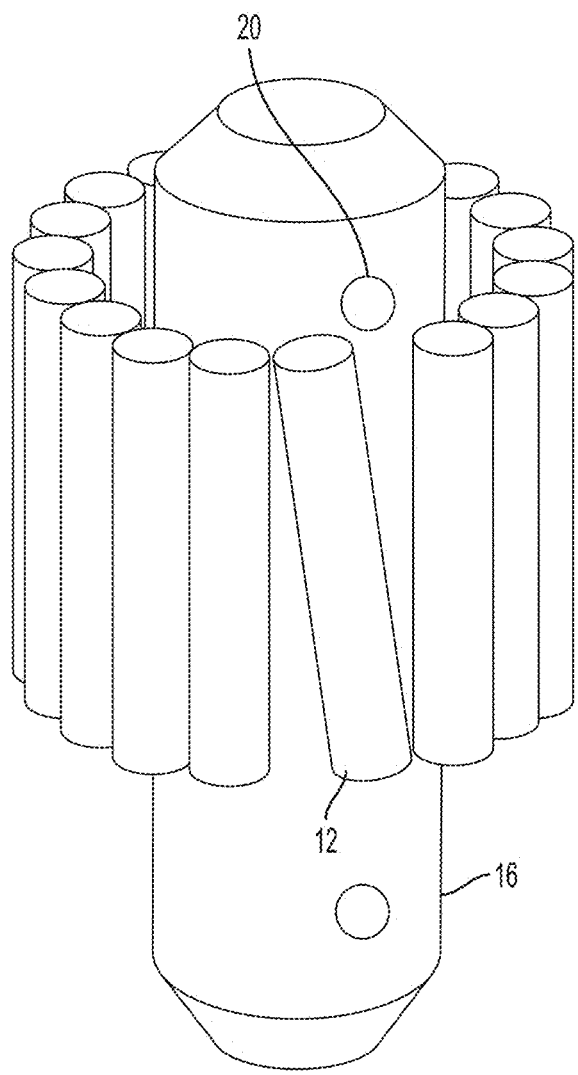
FIG. 2 is an illustration of a process post and needle roller pins that may skew during the carrier assembly process.

With reference to FIG. 1, an illustration of pre-assembled components 10 included in a pinion gear carrier assembly process is presented. The pre-assembled components 10 include needle roller bearing pins 12, a pinion gear 14, a process post 16, and a spider carrier 18. The process post 16 may include at least one ball plunger 20 disposed adjacent either or both ends thereof. During the assembly process, the pinion gear 14 is delivered to a manual build station with the process plug (not shown) and needle roller bearing pins 12 bearings inserted. The manual build station will assemble the pinion gear 14 onto the spider carrier 18 and press the process post 16 through the spider carrier 18 and pinion gear holes pushing the process plug out the other side of the spider carrier 18 to complete pre-production assembly. During this step, as illustrated in FIG. 2, the needle roller bearing pins 12 are free to move and may become skewed or misaligned.

The pre-production spider carrier assembly is then loaded to an automatic station where the final production pin (not shown) is pressed through the spider carrier 18 and pinion gear 14 holes pushing the process post 16 out the other side. During transport from the manual station to the automatic station, the needle roller bearing pins 12 frequently become skewed. Due to the final production pin's slightly larger diameter, the skewed pins are now locked in position preventing free rotation of the pinion gear 14 on the spider carrier 18. After insertion into the spider carrier 18, the final production pin is then "staked" for permanent retention and the assembly is checked for "freeness" whereby each pinion gear must rotate freely. If a pinion gear does not rotate freely then an additional process step of applying a torquing force is required to unlock the pinion gear 14 as a result of skewing of the needle roller bearing pins 12. The high forces required to break a "skew lock" condition creates the need for larger servo motors to apply the forces and additional cycle time for the assembly process. Additionally, there exists the possibility of marring the pinion gear 14 bearing surface which results in material waste or the need for additional machining.

Figure 3:
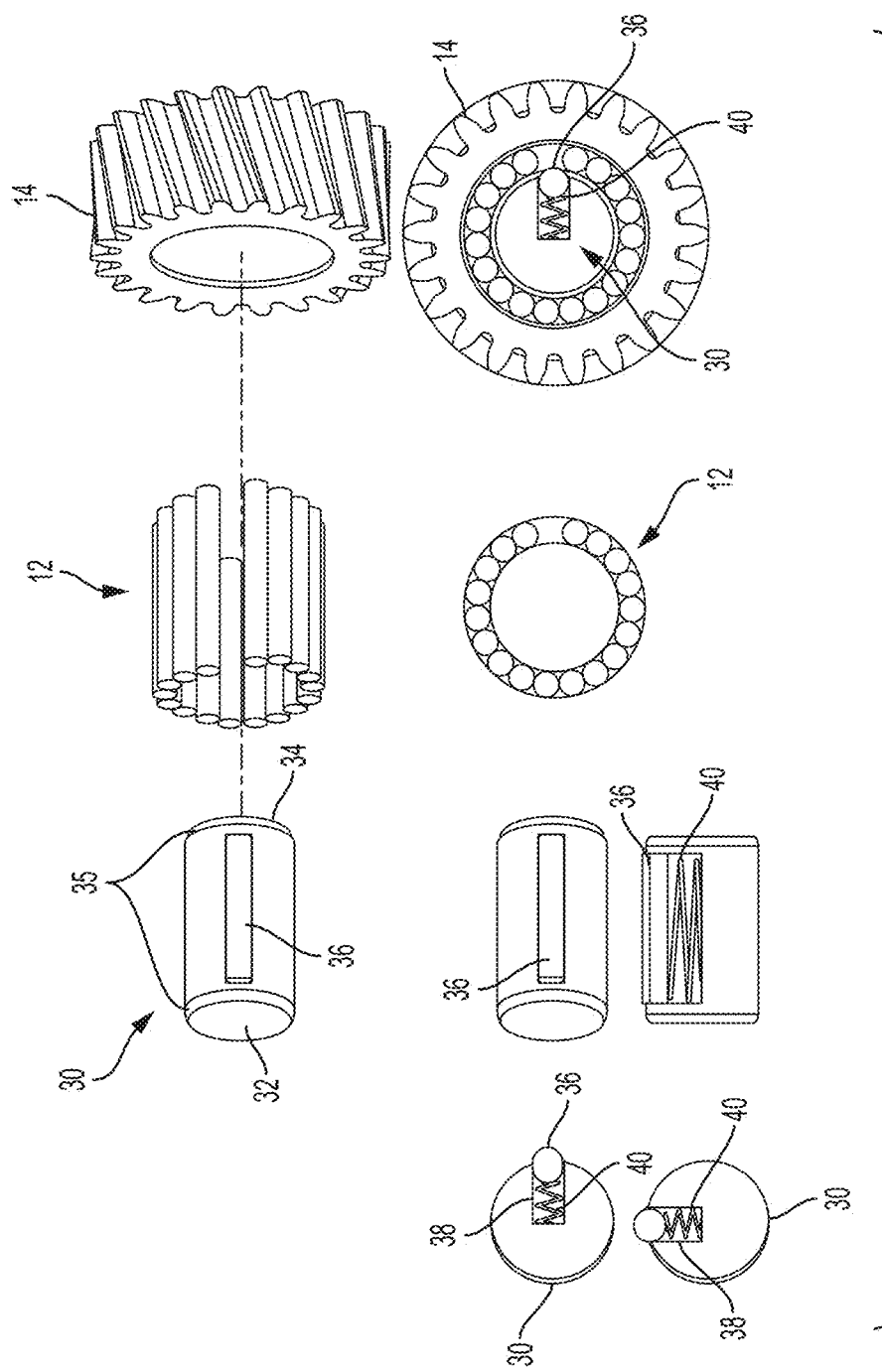
FIG. 3 is an illustration of a needle roller bearing post for use in the carrier assembly process in accordance with aspects of an exemplary embodiment.

Referring now to FIG. 3, an illustration of a needle roller bearing post 30 for use in the carrier assembly process in accordance with aspects of an exemplary embodiment is provided. The solid cylindrical post 30 includes a first end 32, a second end 34, and longitudinal surface wall 35 extending between the two ends. At least one radially recessed channel 38 disposed in the longitudinal surface wall 35 and likewise extends substantially between the first end 32 and the second end 34. A spring biased needle roller 36 is disposed within the at least one radially recessed channel 38 and is operative to provide longitudinal positive contact with adjacent needle roller bearing pins 12 disposed on the longitudinal surface area 35 to prevent needle roller bearing pin skew during pinion gear carrier assembly process.

At least one spring 40 disposed in the at least one radially recessed channel 38 for maintaining a positive biasing force with the spring biased needle roller 36 such that a portion of the roller 36 protrudes outwardly beyond at the longitudinal surface wall 35. The at least one spring 40 substantially extends the length of the at least one radially recessed channel 38. However, it is appreciated that more than one spring may also be used to support the spring biased needle roller 36 without exceeding the scope of the disclosed embodiments.

Referring now to FIG. 4, an enlarged illustration of the needle roller bearing post in accordance with aspects of the exemplary embodiment is provided. The needle roller bearing post 30 may be configured with at least one retention ball plunger 20 disposed adjacent either the first end 32 or the second end 34, or with at least one retention ball plunger 20 disposed adjacent the first end 32 and the second end 34. The retention ball plungers 20 operate to hold the process post 30 in place prior to insertion of the final production pin.

The description of the invention is merely exemplary in nature and variations that do not depart from the gist of the invention are intended to be within the scope of the invention. Such variations are not to be regarded as a departure from the spirit and scope of the invention.

What is claimed is:

1. A pinion needle roller bearing post for use during pinion gear carrier assembly comprising:
   a solid cylindrical post having a longitudinal surface wall extending between a first end and a second end;
   at least one radially recessed channel disposed in the longitudinal surface wall and extends substantially between the first end and the second end; and
   a spring biased needle roller disposed within the at least one radially recessed channel operative to prevent needle roller bearing skew during pinion gear carrier assembly.

2. The post of claim 1 wherein the spring biased needle roller provides longitudinal positive contact with adjacent needle roller bearings on the longitudinal surface wall.

3. The post of claim 1 further comprising at least one retention ball plunger disposed adjacent either the first or the second end.

4. The post of claim 1 further comprising at least one retention ball plunger disposed adjacent the first and the second end.

5. The post of claim 1 further comprising at least one spring disposed in the at least one radially recessed channel for maintaining a positive biasing force with the spring biased needle roller at the longitudinal surface wall.

6. The post of claim 5 wherein the at least one spring substantially extends the length of the at least one radially recessed channel.

7. A pinion needle roller bearing post for use during pinion gear carrier assembly comprising:
   a solid cylindrical post having a longitudinal surface wall extending between a first end and a second end;
   at least one radially recessed channel disposed in the longitudinal surface wall and extends substantially between the first end and the second end;
   a spring biased needle roller disposed within the at least one radially recessed channel operative to prevent needle roller bearing skew during pinion gear carrier assembly, and wherein the spring biased needle roller provides longitudinal positive contact with adjacent needle roller bearings disposed on the longitudinal surface wall; and
   at least one retention ball plunger disposed adjacent either the first end or the second end.

8. A pinion needle roller bearing post for use during pinion gear carrier assembly comprising:
   a solid cylindrical post having a longitudinal surface wall extending between a first end and a second end;
   at least one radially recessed channel disposed in the longitudinal surface wall and extends substantially between the first end and the second end; and
   a spring biased needle roller disposed within the at least one radially recessed channel operative to prevent needle roller bearing skew during pinion gear carrier assembly, and wherein the spring biased needle roller provides longitudinal positive contact with adjacent needle roller bearings disposed on the longitudinal surface wall;
   a retention ball plunger disposed adjacent the first end or the second end; and
   a spring disposed in the at least one radially recessed channel for maintaining a positive biasing force with the spring biased needle roller at the longitudinal surface wall.

* * * * *